US008713203B2

(12) United States Patent
Wang et al.

(10) Patent No.: US 8,713,203 B2
(45) Date of Patent: Apr. 29, 2014

(54) STATISTICAL INFORMATION COLLECTION FROM ONE OR MORE DEVICE(S) IN STORAGE COMMUNICATION WITH A COMPUTING PLATFORM

(75) Inventors: Ming-jen Wang, Colorado Springs, CO (US); Terry Russell Gibbons, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 357 days.

(21) Appl. No.: 12/958,433

(22) Filed: Dec. 2, 2010

(65) Prior Publication Data

US 2012/0144069 A1  Jun. 7, 2012

(51) Int. Cl.
*G06F 3/00* (2006.01)
*G06F 11/30* (2006.01)
*G06F 11/34* (2006.01)

(52) U.S. Cl.
CPC ............ *G06F 11/3003* (2013.01); *G06F 11/34* (2013.01)
USPC .................................. 710/3; 710/15; 710/18

(58) Field of Classification Search
None
See application file for complete search history.

(56) References Cited

U.S. PATENT DOCUMENTS

| 2004/0131072 | A1* | 7/2004 | Khan et al. ............... 370/419 |
| 2007/0253474 | A1 | 11/2007 | Smith |
| 2008/0187033 | A1 | 8/2008 | Smith |
| 2010/0014567 | A1* | 1/2010 | Yamamoto ............... 375/220 |
| 2010/0201345 | A1* | 8/2010 | Gupta et al. ............... 324/96 |

OTHER PUBLICATIONS

Microsoft Computer Dictionary; 2002; Microsoft Press; Fifth Edition; p. 468.*

* cited by examiner

*Primary Examiner* — Idriss N Alrobaye
*Assistant Examiner* — Richard B Franklin
(74) *Attorney, Agent, or Firm* — Raj Abhyanker, P.C.

(57) ABSTRACT

A method includes addressing, through a command generated by an application executing on a computing platform, one or more device(s) in storage communication with the computing platform based on an appropriate communication link. The method also includes accessing, based on the addressing, a physical register of the one or more device(s) through an appropriate interface therein. Further, the method includes obtaining statistical information associated with a performance of the one or more device(s) at the computing platform through the access of the physical register.

21 Claims, 6 Drawing Sheets

| BYTE 254 \ BIT 252 | 7 | 6 | 5 | 4 | 3 | 2 | 1 | 0 |
|---|---|---|---|---|---|---|---|---|
| 0 | OPERATION CODE 202 |||||||| 
| 1 | RESERVED 210 |||||  FIRMWARE ENABLE 208 | DEVICE TYPE 206 | DIRECTION 204 |
| 2 | RESERVED 210 ||||||||
| 3 | |||||||| 
| 4 | REGISTER ADDRESS 212 ||||||||
| 5 | ||||||||
| 6 | WRITE DATA 214 ||||||||
| 7 | ||||||||
| 8 | ||||||||
| 9 | ||||||||

← DESCRIPTOR BLOCK 200

FIGURE 2

STATISTICAL INFORMATION COLLECTION FROM ONE OR MORE DEVICE(S) IN STORAGE COMMUNICATION WITH A COMPUTING PLATFORM

FIELD OF TECHNOLOGY

This disclosure relates generally to storage communication and, more particularly, to a method, an apparatus and/or a system of collecting statistical information from one or more device(s) in storage communication with a computing platform.

BACKGROUND

Statistical information from a device in storage communication (e.g., through a Serial Attached Small Computer System Interface (Serial Attached SCSI, or, SAS) protocol) with a computing platform may be obtained through additional hardware associated with the device. As the statistical information may be associated with performance, the additional hardware may allow for adjustments to time and voltage while collecting pass/fail conditions associated with the device.

Provision of the additional hardware may further necessitate provision of a hardware connector, special cabling, and a translation hub. Further, a computer (e.g., a laptop) may be required to collect data to be displayed (e.g., in the form of an eye pattern). The additional hardware and the components associated therewith may be seen as cumbersome infrastructure and/or an additional expense. Further, the space occupied by the additional components may be a long-term cost adder to the storage environment.

In a typical storage environment, a number of devices may be in storage communication with the computing platform. Therefore, signal integrity measurements between the computing platform and the device in storage communication therewith may be important. However, due to the increase in the number of additional components with the increase in the number of devices, signal integrity measurements in the storage environment may become tedious. Moreover, as the signal integrity measurements are taken external to the device(s) in storage communication with the communication platform, the signal integrity measurements may not be accurate.

SUMMARY

Disclosed are a method, an apparatus and/or a system of collecting statistical information from one or more device(s) in storage communication with a computing platform.

In one aspect, a method includes addressing, through a command generated by an application executing on a computing platform, one or more device(s) in storage communication with the computing platform based on an appropriate communication link. The method also includes accessing, based on the addressing, a physical register of the one or more device(s) through an appropriate interface therein. Further, the method includes obtaining statistical information associated with a performance of the one or more device(s) at the computing platform through the access of the physical register.

In another aspect, a method includes transmitting a number of commands generated by an application executing on a computing platform to one or more device(s) in storage communication with the computing platform based on an appropriate communication link. The method also includes interpreting the number of commands through a set of instructions executing on the one or more device(s), and accessing a number of physical registers of the one or more device(s) based on the interpretation of the number of commands through one or more interface(s) therein. Further, the method includes obtaining statistical information associated with the one or more device(s) at the computing platform through the access of the number of physical registers, and measuring signal integrity between the computing platform and the one or more device(s) based on the obtained statistical information at the computing platform.

In yet another aspect, a storage environment includes a computing platform configured to have an application executing thereon and one or more device(s) in storage communication with the computing platform based on an appropriate communication link. The one or more device(s) is configured to be addressed through a command generated by the application executing on the computing platform. The one or more device(s) is further configured to have a set of instructions executing thereon, and includes a physical register and an internal interface thereto configured to be accessed through the set of instructions.

The computing platform is configured to obtain statistical information associated with a performance of the one or more device(s) through the access of the physical register and the internal interface.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 2 is a schematic view of a descriptor block describing a Small Computer System Interface (SCSI) command configured to allow access of a register within a drive bridge through a host device or an initiator associated therewith, according to one or more embodiments.

DETAILED DESCRIPTION

Disclosed are a method, an apparatus and/or a system of collecting statistical information from one or more device(s) in storage communication with a computing platform. Although the present embodiments have been described with reference to specific example embodiments, it will be evident that various modifications and changes may be made to these embodiments without departing from the broader spirit and scope of the various embodiments.

Figure 1:
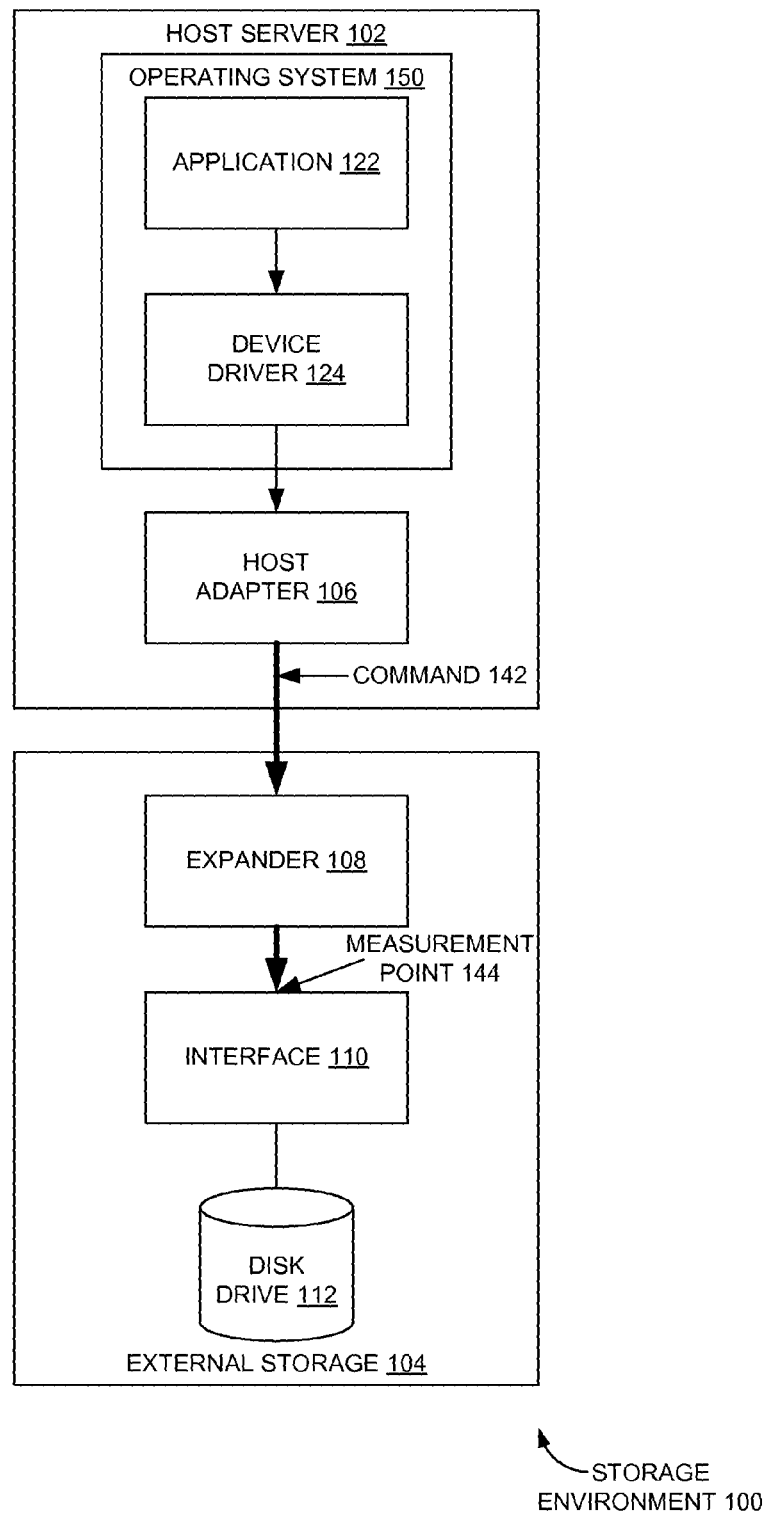
FIG. 1 is a schematic view of a storage environment, according to one or more embodiments.

FIG. 1 shows a storage environment 100, according to one or more embodiments. In one or more embodiments, storage environment 100 may include a host server 102 having external storage 104 associated therewith. In one or more embodiments, host server 102 may be coupled to external storage 104 through a host adapter 106. In an example embodiment, when a Small Computer System Interface (SCSI) bus associated with external storage 104 is to be coupled to an internal bus associated with host server 102, an SCSI host adapter may be utilized therefor as host adapter 106. The SCSI host adapter may enable overcoming of the logical/physical divide existing between the aforementioned internal bus associated with host server 102 and the SCSI bus.

In one or more embodiments, host server 102 and external storage 104 may be configured to communicate with each other through a protocol (e.g., Serial Attached SCSI (SAS), Fibre Channel Protocol (FCP)). Therefore, in one or more embodiments, host adapter 106 may include the appropriate firmware required to execute transactions associated with the aforementioned communication protocol. In an example embodiment, a device driver, linked to an operating system associated with host adapter 106, may be configured to control host adapter 106.

In an example SAS environment including host server 102 and external storage 104, host server 102 may be coupled to external storage 104 through a Peripheral Component Interconnect Express (PCI Express) host bus adapter (HBA). A SAS communication link may extend from host server 102 over, for example, a cable. The SAS communication link may then extend optionally through an expander device (e.g., expander 108) and/or may terminate at an interface 110 to a disk drive 112. The interface (e.g., interface 110) between the SAS link and disk drive 112 may be a drive bridge. The expander (e.g., expander 108) may also have disk drive(s) (not shown) associated therewith.

Components of a SAS environment, i.e., SAS devices such as controllers (e.g., HBAs), expanders, drive bridges and multiplexers (e.g., LSI®'s Active-Active Multiplexer devices (AAMUX™s)), may provide the capability to collect statistical information (e.g., statistical information associated with performance) from a SAS receiver (e.g., another SAS device such as a controller, an expander, a drive bridge and a multiplexer) through appropriate circuitry associated therewith. For example, an eye pattern detection circuit at the output of the SAS receiver may enable the measurement of the eye pattern associated therewith. The eye pattern associated with the signal interpreted by the SAS receiver may be generated analogous to a scenario where a pseudorandom digital signal is repetitively sampled, applied to the vertical input of an oscilloscope, and displayed therein. The data rate may be used to trigger the horizontal sweep.

The inclusion of the eye pattern detection circuit may require an additional hardware connector, special cabling and/or a translation hub. A computer (e.g., a laptop) may also be required to gather and display data. The aforementioned infrastructural requirements may be deemed to be cumbersome and/or may result in additional expense. The additional hardware connector and the space required therefor may also be seen as contributing to the long-term costs. In the case of obtaining eye pattern associated with a drive bridge, it may be impossible to mount the additional hardware connector due to the small form factor thereof. In one or more embodiments, utilizing existing storage hardware and communication protocol(s) for generating the eye diagram described above may dispense with the infrastructural requirements.

In one or more embodiments, firmware/software (e.g., a set of instructions; not shown in FIG. 1) may be configured to execute on the SAS device(s) (or, the SAS receiver(s)) discussed above. In one or more embodiments, the firmware may include instructions, programs and/or data structures configured to control the SAS device(s) (or, the SAS receiver(s)) and/or the data flow thereto/therefrom. The eye pattern detection circuit discussed above may allow for adjustments in time and voltage to collect pass/fail conditions associated with the SAS receiver(s). In one or more embodiments, an eye diagram may also be obtained when the aforementioned data (e.g., pass/fail conditions associated with the SAS receiver(s)) is collected through the execution of a set of instructions (e.g., a program) that alters the settings (e.g., adjustments in time, voltage) on a formulaic basis instead of utilizing the eye pattern detection circuit therefor.

In one or more embodiment, the eye diagram obtained through the program execution may be superior to that obtained through analog measurement data collected outside the SAS receiver(s) because of the conciseness of the information and the closeness of the representation to what the SAS receiver(s) actually interprets. In one or more embodiments, therefore, the additional hardware interface discussed above may be dispensed with.

In one or more embodiments, an application 122 written and/or installed at host server 102 may be configured to generate a SCSI command (e.g., command 142) with a custom payload. In one or more embodiments, the aforementioned SCSI command may be addressed to host adapter 106, expander 108 and/or interface 110 (e.g., drive bridge). In one or more embodiments, the SCSI command may be transmitted through Input/Output (IO) device driver(s) 124 to and/or through the SAS device(s) (e.g., host adapter 106, expander 108, interface 110) that are part of the SAS environment.

FIG. 1 shows application 122 and device driver(s) 124 as being part of an operating system 150 executing on host server 102. In one or more embodiments, upon receipt of the SCSI command at a SAS device, the firmware executing thereon may be configured to accept the command (e.g., command 142), interpret the command and take action(s) specific to the SAS device. In one or more embodiments, the action(s) may include accessing vendor-specific interfaces within the SAS device to read/write data associated with the measurement point (e.g., measurement point 144) thereof. Measurement point 144 is shown as exiting between expander 108 and interface 110 as an example. It is obvious that other measurement points may be considered. For example, measurement point 144 may also be shown as exiting between interface 110 and disk drive 112.

An example implementation discussed with regard to a drive bridge will be discussed below. It is obvious that the concepts discussed herein may be applicable to other SAS device(s) (e.g., host controller, expander). In one or more embodiments, although the drive bridge may have external hardware interface(s) associated with accessing internal registers therein, users/customers may find the use thereof difficult when the drive bridge is in an enclosure. As discussed above, in one or more embodiments, a host application (e.g., application 122) may be configured to transmit vendor-specific commands to the drive bridge in order to access the registers therein. In one or more embodiments, the access of the aforementioned registers may lead to the plot of the eye diagram associated with the drive bridge through the host application (e.g., application 122).

FIG. 2 shows descriptor block 200 describing an SCSI command configured to allow access of a register within the drive bridge through a host device (e.g., host server 102) or an initiator associated therewith, according to one or more embodiments. In the example embodiment shown in FIG. 2, descriptor block 200 is shown as being of 10 bytes in length. However, it is obvious that other lengths are within the scope of the exemplary embodiments. The rows indicate byte numbers (e.g., byte 254), and the columns indicate bit numbers (e.g., bit 252) within a particular byte. The first byte (e.g., byte 0) is shown as being associated with an operation code 202 specifying the operation to be performed.

In the second byte (e.g., byte 1), when bit 0 (e.g., direction 204) is set (i.e., is 1), the operation is a write access. When direction 204 is cleared (i.e., is 0), the operation is a read access. Thus, direction 204 may specify a type of access. It is obvious that other ways of indicating the read/write access are within the scope of the exemplary embodiments. In the second byte (e.g., byte 1), bit 1 (e.g., device type 206) may indicate whether a SAS register or a Serial Advanced Technology Attachment (SATA) register is to be used. For example, when device type 206 is set, the SATA register may be used, and when device type 206 is cleared, the SAS register may be used. Again, other ways of indicating the use of SAS registers/SATA registers are within the scope of the exemplary embodiments.

In the second byte (e.g., byte 1), bit 2 (e.g., firmware enable 208) may indicate as to whether the firmware associated with the corresponding drive bridge is allowed to access the internal register(s) through appropriate interface(s) (e.g., Management Data 10 (MDIO) interface) therein. Thus, in one or more embodiments, firmware enable 208 may be set for all commands associated with accessing the interface(s). When host server 102 or the initiator is finished with transmitting the commands associated with accessing the interface(s), host server 102 or the initiator may further be configured to transmit another command with firmware enable 208 cleared in order to return control(s) to the external hardware interface(s) associated with the drive bridge. For example, the external hardware interface(s) may be ports (e.g., pins) on the drive bridge.

Bits 3-7 of byte 1 and bytes 2-3 may be reserved for future use. FIG. 2 shows the aforementioned bits and bytes as Reserved 210. Reserved bits and/or bytes may be subjected to use and interpretation based on specification(s) that depend on future extensions to descriptor block 200. For example, the reserved bit(s) and/or byte(s) may be set to 0, in accordance with a future extension. It is obvious that the firmware associated with the drive bridge may interpret the bits and/or byte(s) in accordance with the future extension.

Bytes 4-5 may be reserved for register address 212, which is the offset associated with the register(s) described above. For example, register address 212 may have an offset of 4 starting from byte 0, as shown in FIG. 2. Thus, register address 212 may be a 16-bit value that is also 4-byte aligned. Therefore, the least significant two bits of register address may be always set to 0. The least significant bits are at the right side of FIG. 2 and the most significant bits are at the left.

It is obvious other example implementations (e.g., with different number of bits for representation, with different bit indicators) are within the scope of the exemplary embodiments.

Byte 7-9 may be reserved for write data 214, which host server 102 or the initiator may want to write to the register(s). Obviously, the aforementioned field may be valid only when direction 204 is set. When the firmware executing on the drive bridge receives the access command, the appropriate functions (to be discussed below) associated with the interface(s) in the drive bridge may be called therethrough.

Figure 3:
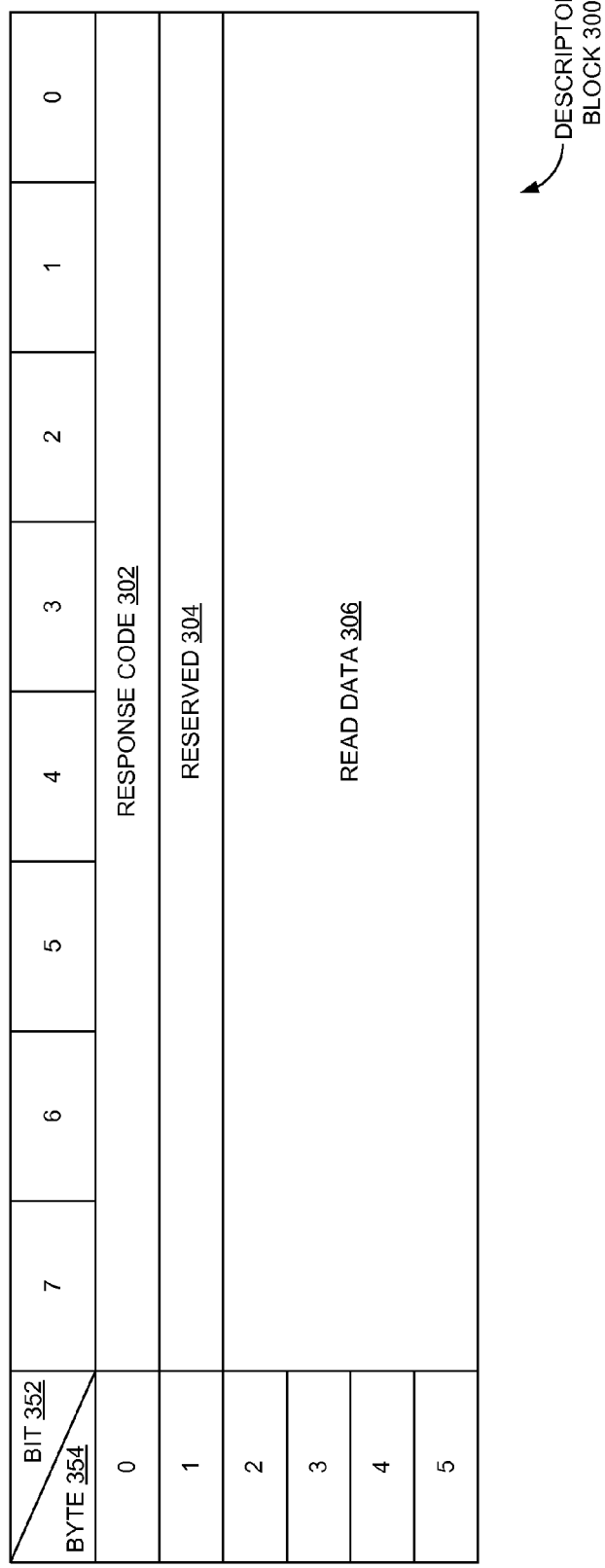
FIG. 3 is a schematic view of a descriptor block describing an SCSI command transmitted by the drive bridge in response to the SCSI command of FIG. 2 associated with a read access of the register within the drive bridge.

For write access to the register(s) discussed above, the drive bridge may be configured to set an appropriate field in a response frame thereof to an appropriate value that serves to indicate the absence of data (because of the write operation). The drive bridge may also be configured to reply to the register access command with a SCSI status code (e.g., indicating that the SCSI status is "Good"). FIG. 3 shows descriptor block 300 describing an SCSI command transmitted by the drive bridge in response to the SCSI command associated with the register read access discussed above. For the register read access, the drive bridge may be configured to set the appropriate field in the response frame to another appropriate value that serves to indicate the presence of data to be read (e.g., sense data). Again, the drive bridge may also be configured to reply with the SCSI status code (e.g., indicating that the SCSI status is "Good").

In the example embodiment shown in FIG. 3, descriptor block 300 is shown as being of 6 bytes in length. However, it is obvious that other lengths are within the scope of the exemplary embodiments. Again, the rows are associated with the bytes (e.g., byte 354) and the columns are associated with bits within a byte (e.g., bit 352). The first byte (e.g., byte 0) is shown as being associated with a vendor-specific response code 302. The second byte (e.g., byte 1) is shown as being Reserved 304. Again, as discussed above, reserved bits and/or bytes may be subjected to use and interpretation based on specification(s) that depend on future extensions to descriptor block 300.

Bytes 2-5 may be reserved for read data 306, which in the example embodiment shown in FIG. 3 is of 4 bytes in length. For example, sense data from the drive bridge may be read data 306. The sense data may be associated with error information from the drive bridge. Read data 306 may be placed in the sense data field and the "Good" SCSI status may be returned to host server 102 or the initiator.

Figure 4:
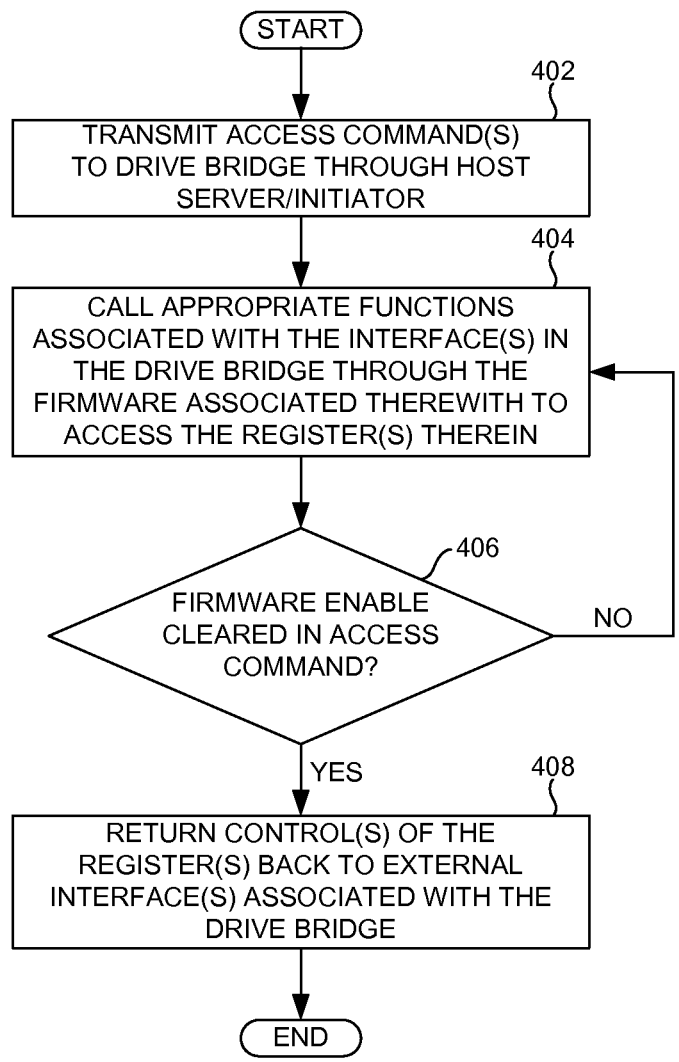
FIG. 4 is a flowchart detailing the operations involved in accessing register(s) associated with a drive bridge through a host device or an initiator, according to one or more embodiments.

FIG. 4 shows a flowchart detailing the operations involved during access of the register(s) associated with the drive bridge through host server 102 or the initiator, according to one or more embodiments. In one or more embodiments, operation 402 may involve transmitting an access command to the drive bridge through host server 102 or the initiator. The access command is discussed with regard to descriptor block 200 in FIG. 2. In one or more embodiments, host server 102 or the initiator may transmit the access command with each of the field(s) thereof filled appropriately. For example, as discussed above, firmware enable 208 may be set. In one or more embodiments, operation 404 may involve calling appropriate functions (to be discussed below) associated with the interface(s) (e.g., MDIO interfaces) in the drive bridge through the firmware associated therewith to access the register(s) therein.

In one or more embodiments, application 122 may access the register(s) of the drive bridge a number of times in order to create the statistical eye diagram. In one or more embodiments, at the end of the session, host server 102 or initiator may transmit a last access command with firmware enable

208 cleared. Thus, in one or more embodiments, operation 406 may involve checking as to whether firmware enable 208 is cleared in the access command. In one or more embodiments, if yes, operation 408 may involve the firmware returning control(s) of the register(s) back to the external hardware interface(s) (e.g., pins) associated with the drive bridge. Else, in one or more embodiments, the preceding operation may be continued until firmware enable 208 is cleared.

An example function associated with the internal interface(s) (e.g., MDIO interface) in the drive bridge may be a function configured to initialize the internal interface(s) and to enable firmware control of the registers through the internal interface(s). The aforementioned function may be called when the firmware executing on the drive bridge receives the very first access command, with firmware enable 208 being set.

Another example function may be a function to return the control of the register(s) back to the external hardware interface(s), as discussed above. The aforementioned function may be called when the firmware associated with the drive bridge receives an access command with firmware enable 208 cleared.

Yet another example function may be a function to read from the register(s) within the drive bridge. The register(s) may be specified by the address thereof. The aforementioned function may be called when the firmware associated with the drive bridge receives an access command with firmware enable 208 set and direction 204 cleared.

Further, another example function may be a function to write to the register(s) within the drive bridge. The register(s) may, again, be specified by the address thereof. The aforementioned function may be called when the firmware associated with the drive bridge receives an access command with firmware enable 208 set and direction 204 set.

To summarize, in one or more embodiments, a host application (e.g., application 122) may generate a vendor specific command, as discussed above, and may utilize the aforementioned command to read from/write to the register(s) within the drive bridge. This may result in the plotting of an eye diagram associated with the drive bridge through the host application. In one or more embodiments, thus, statistical data associated with the drive bridge (an example of the SAS receiver) may be collected non-invasively. In one or more embodiments, the statistical data may be closer to the interpretation(s) of the drive bridge than when collected outside the drive bridge through analog measurements.

Although FIG. 1 shows an example host server 102 (or an initiator) as having application 122 executing thereon, any computing platform executing application 122 is within the scope of the exemplary embodiments. Further, it is obvious that the register(s) discussed above are physical registers, which are mapped to a memory to enable access thereof through the internal interface(s) discussed above. Although a SAS communication link has been discussed above, the concepts involved herein may also apply to other serial communication links, parallel communication links (e.g., through parallel SCSI bus) and other forms of communication links. Again, the constituent fields of descriptor block 200 and/or descriptor block 300 and/or the implementation of the commands discussed above may be varied.

In one or more embodiments, through the exemplary embodiments discussed above, measurement of signal integrity between the computing platform and the one or more device(s) may be eased. In one or more embodiments, as the one or more device(s) are in storage communication with the computing platform, a device may be directly coupled to the computing platform or indirectly coupled thereto through another device. Therefore, in one or more embodiments, signal integrity between two devices in storage communication with the computing platform may be easily measured.

Figure 5:
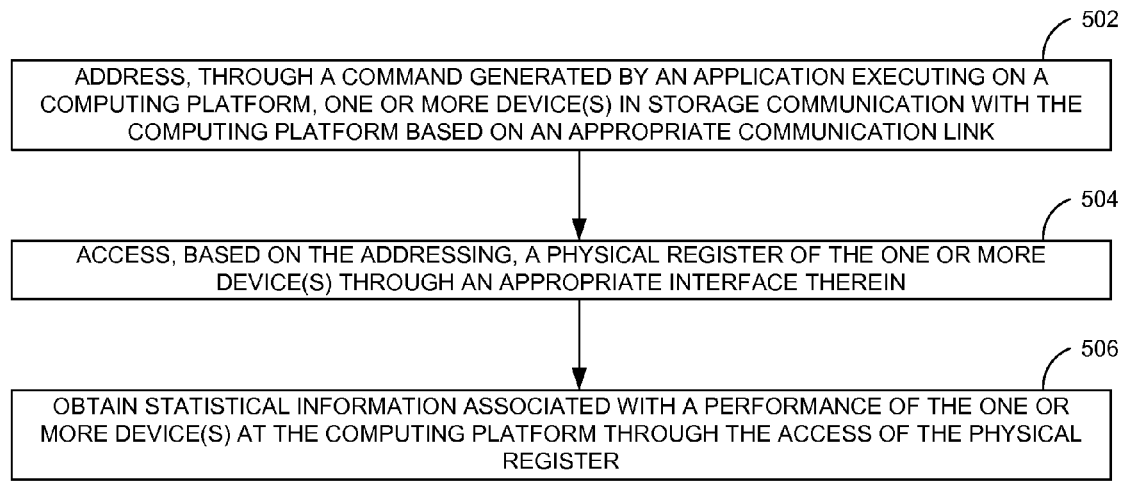
FIG. 5 is a process flow diagram detailing the operations involved in a method of collecting statistical information associated with one or more device(s) in storage communication with a computing platform, according to one or more embodiments.

FIG. 5 shows a process flow diagram detailing the operations involved in a method of collecting statistical information associated with one or more device(s) in storage communication with a computing platform (e.g., host server 102), according to one or more embodiments. In one or more embodiments, operation 502 may involve addressing the one or more device(s) through a command (e.g., command 142) generated by an application (e.g., application 122) executing on the computing platform. In one or more embodiments, the one or more device(s) may be in storage communication with the computing platform based on an appropriate communication link.

In one or more embodiments, operation 504 may involve accessing, based on the addressing, a physical register of the one or more device(s) through an appropriate interface therein. In one or more embodiments, operation 506 may then involve obtaining statistical information associated with a performance of the one or more device(s) at the computing platform through the access of the physical register.

Figure 6:
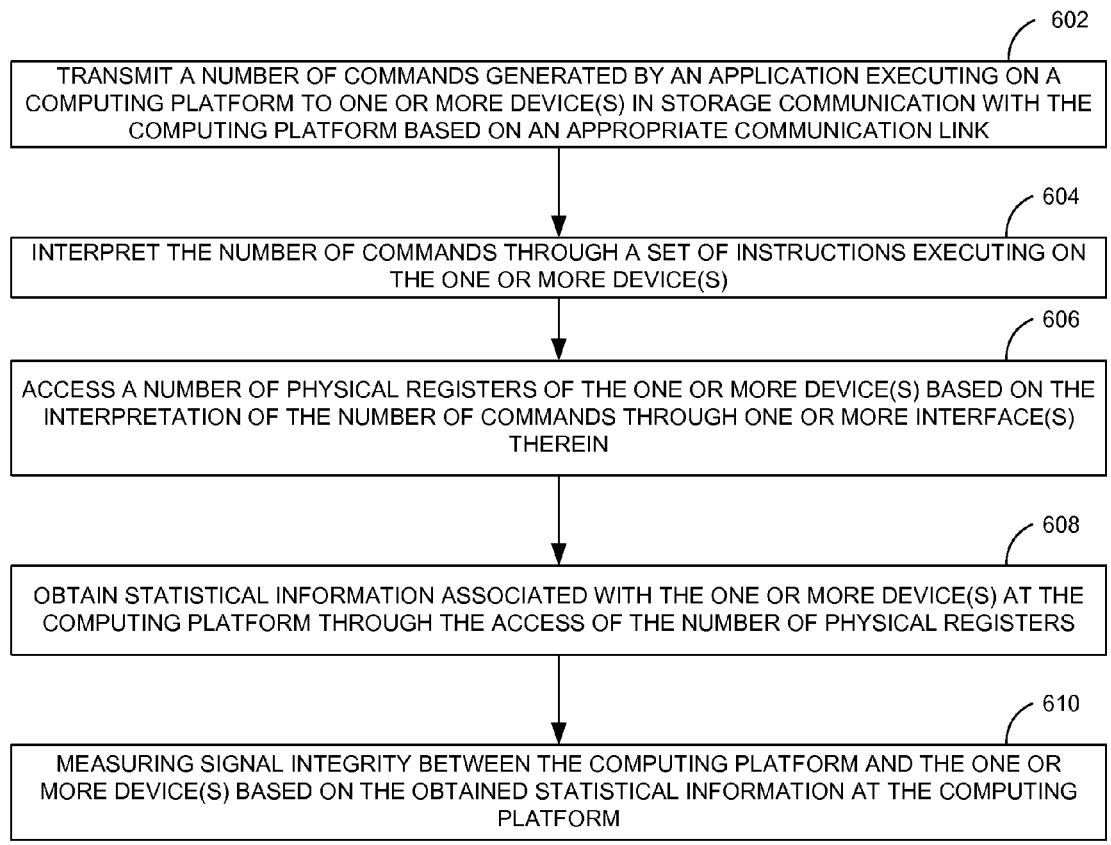
FIG. 6 is a process flow diagram detailing the operations involved in measuring signal integrity between a computing platform and one or more device(s) in storage communication therewith, according to one or more embodiments.

FIG. 6 shows a process flow diagram detailing the operations involved in measuring signal integrity between a computing platform (e.g., host server 102) and one or more device(s) in storage communication therewith, according to one or more embodiments. In one or more embodiments, operation 602 may involve transmitting a number of commands (e.g., command 142) generated by an application (e.g., application 122) executing on the computing platform to the one or more device(s). In one or more embodiments, the one or more device(s) may be in storage communication with the computing platform based on an appropriate communication link.

In one or more embodiments, operation 604 may involve interpreting the number of commands through a set of instructions executing on the one or more device(s). In one or more embodiments, operation 606 may involve accessing a number of physical registers of the one or more device(s) based on the interpretation of the number of commands through one or more interface(s) therein. In one or more embodiments, operation 608 may involve obtaining statistical information associated with the one or more device(s) at the computing platform through the access of the number of physical registers. In one or more embodiments, operation 610 may then involve measuring signal integrity between the computing platform and the one or more device(s) based on the obtained statistical information at the computing platform.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method comprising:
   addressing, through a command generated by an application executing on a computing platform, at least one device in storage communication with the computing platform based on an appropriate communication link, the command being based on a Small Computer System Interface (SCSI) standard;
   accessing, based on the addressing, a physical register of the at least one device through an appropriate interface therein; and
   obtaining statistical information associated with a performance of the at least one device at the computing platform through the access of the physical register without a requirement of an additional hardware interface and a new communication protocol on which the command and the storage communication are based.

2. The method of claim 1, wherein accessing the physical register of the at least one device comprises:
   interpreting the command through a set of instructions executing on the at least one device; and
   accessing the appropriate interface within the at least one device based on the interpretation of the command through the set of instructions.

3. The method of claim 2, wherein interpreting the command through the set of instructions includes calling an appropriate function associated with the appropriate interface through the set of instructions to access the physical register, the appropriate function being one of:
   a function to initialize the appropriate interface and to enable control of the physical register through the set of instructions,
   a function to return control of the physical register from the set of instructions to an external hardware interface associated with the at least one device,
   a function to read from the physical register, and
   a function to write to the physical register.

4. The method of claim 1, wherein the appropriate communication link is one of a serial SCSI bus and a parallel SCSI bus.

5. The method of claim 1, wherein addressing the at least one device includes specifying one of a read access and a write access of the physical register, a type of the at least one device, and an address associated with the physical register in a descriptor block associated with the command.

6. The method of claim 5, further comprising transmitting, through the at least one device, a status code thereof in a response command to the command from the computing platform.

7. The method of claim 6, further comprising:
   placing data to be written to the physical register in a field of the descriptor block associated with the command during the write access; and
   placing data to be read from the physical register in a field of a descriptor block associated with the response command during the read access.

8. The method of claim 1, further comprising deriving an eye pattern associated with the at least one device through the application at the computing platform based on the obtained statistical information.

9. A method comprising:
   transmitting a plurality of commands generated by an application executing on a computing platform to at least one device in storage communication with the computing platform based on an appropriate communication link, the plurality of commands being based on an SCSI standard;
   interpreting the plurality of commands through a set of instructions executing on the at least one device;
   accessing a plurality of physical registers of the at least one device based on the interpretation of the plurality of commands through at least one interface therein;
   obtaining statistical information associated with the at least one device at the computing platform through the access of the plurality of physical registers without a requirement of an additional hardware interface and a new communication protocol on which the plurality of commands and the storage communication are based; and
   measuring signal integrity between the computing platform and the at least one device based on the obtained statistical information at the computing platform.

10. The method of claim 9, wherein the appropriate communication link is one of a serial SCSI bus and a parallel SCSI bus.

11. The method of claim 9, wherein transmitting each command of the plurality of commands includes specifying one of a read access and a write access of a register of the plurality of physical registers, a type of the at least one device, and an address associated with the register of the plurality of physical registers in a descriptor block associated with the each command.

12. The method of claim 11, further comprising:
   placing data to be written to the register of the plurality of physical registers in a field of a descriptor block associated with the each command; and
   placing data to be read from the register of the plurality of physical registers in a field of a descriptor block associated with a response command from the at least one device to the each command from the computing platform.

13. The method of claim 9, comprising measuring the signal integrity by deriving an eye pattern associated with the at least one device through the application at the computing platform based on the obtained statistical information.

14. The method of claim 9, further comprising returning control of the plurality of physical registers from the set of instructions to at least one external hardware interface associated with the at least one device following the obtaining of the statistical information.

15. A storage environment comprising:
   a computing platform configured to have an application executing thereon; and
   at least one device in storage communication with the computing platform based on an appropriate communication link, the at least one device being configured to be addressed through a command generated by the application executing on the computing platform, the at least one device further being configured to have a set of instructions executing thereon, the command being based on an SCSI standard, and the at least one device including a physical register and an internal interface thereto configured to be accessed through the set of instructions,
   wherein the computing platform is configured to obtain statistical information associated with a performance of the at least one device through the access of the physical register and the internal interface without a requirement of an additional hardware interface and a new communication protocol on which the command and the storage communication are based.

16. The storage environment of claim 15, wherein the appropriate communication link is one of a serial SCSI bus and a parallel SCSI bus.

17. The storage environment of claim 15, wherein, during the addressing of the at least one device through the command, the application executing on the computing platform is configured to specify one of a read access and a write access of the physical register, a type of the at least one device, and an address associated with the physical register in a descriptor block associated with the command.

18. The storage environment of claim 17, wherein the at least one device is configured to transmit a status code thereof in a response command to the command from the computing platform.

19. The storage environment of claim 18,
wherein data to be written to the physical register is placed in a field of the descriptor block associated with the command during the write access, and
wherein data to be read from the physical register is placed in a field of a descriptor block associated with the response command during the read access.

20. The storage environment of claim 15, wherein the application is configured to derive an eye pattern associated with the at least one device on the obtained statistical information.

21. The storage environment of claim 15, wherein the set of instructions executing on the at least one device is configured to call an appropriate function associated with the internal interface to access the physical register, the appropriate function being one of:
a function to initialize the internal interface and to enable control of the physical register through the set of instructions,
a function to return control of the physical register from the set of instructions to an external hardware interface associated with the at least one device,
a function to read from the physical register, and
a function to write to the physical register.

* * * * *